(No Model.)
I. W. McGAFFEY.
HOSE REEL.
No. 286,046. Patented Oct. 2, 1883.
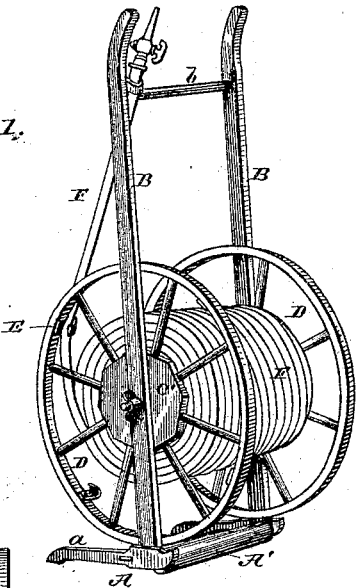
Fig. 1.
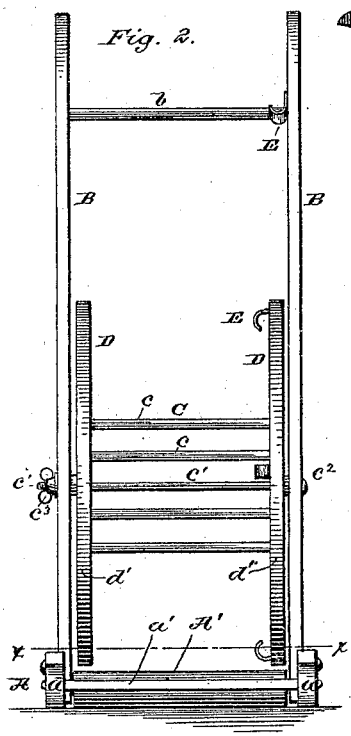
Fig. 2.
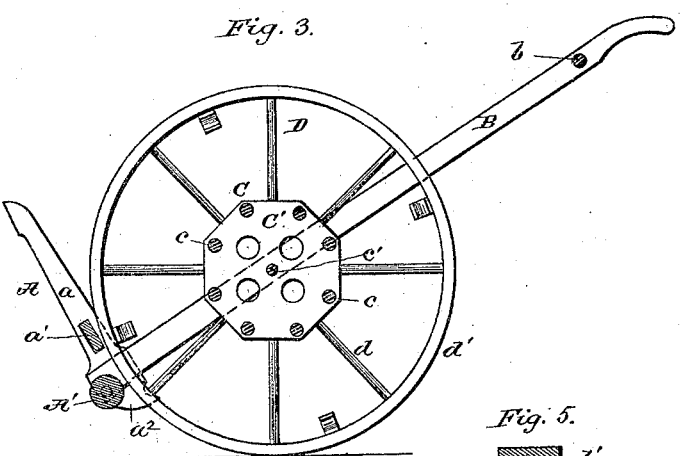
Fig. 3.
Fig. 6.
Fig. 5.
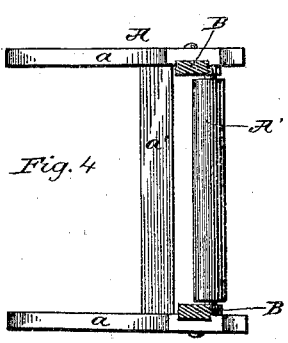
Fig. 4.
Witnesses:
Jno. W. Stockett
C. C. Poole
Inventor.
Ives W. McGaffey
per W. E. Dayton
Attorney.

UNITED STATES PATENT OFFICE.

IVES W. McGAFFEY, OF CHICAGO, ILLINOIS.

HOSE-REEL.

SPECIFICATION forming part of Letters Patent No. 286,046, dated October 2, 1883.

Application filed June 14, 1883. (No model.)

*To all whom it may concern:*

Be it known that I, IVES W. McGAFFEY, of Chicago, in the county of Cook and State of Illinois, have invented certain new and useful Improvements in Portably-Mounted Hose-Reels; and I do hereby declare that the following is a full, clear, and exact description thereof, reference being had to the accompanying drawings, and to the letters of reference marked thereon, which form a part of this specification.

This invention relates to that class of portably-mounted hose-reels in which the flanges of the drum on which the hose is wound or stored are made to serve as the wheels upon which the reel is moved from place to place.

The invention consists, primarily, in a frame composed of a base, uprights forming a handle or handles secured to the base, and a rim-wheeled drum rotatably mounted between the uprights, with its axis over the rear part of the base and with its wheels near the ground, whereby the reel may either stand upon the frame-base, or, when the uprights or handles are tilted into convenient position to be held by a person standing, the wheels only rest upon the ground; or, if the handles are slightly raised from the latter position, the weight falls upon the rear of the base and the handle, and the drum-wheel is lifted clear of the ground. The invention, however, embraces other matters, which, with that specified, will be hereinafter more fully set forth, and pointed out in the appended claims.

In the accompanying drawings, Figure 1 is a perspective view of my improved apparatus in a vertical section. Fig. 2 is a front elevation. Fig. 3 is a central vertical section transverse to the axis of the reel-drum, showing the frame tilted and the drum resting on the ground, as when the reel is being moved from place to place. Fig. 4 is a horizontal section on line $x\,x$ of Fig. 2. Fig. 5 is a fragmentary section of the wheel-rim detached, showing the clip for holding the hose thereto attached. Fig. 6 is a fragmentary view of an upright or handle, together with the upper cross-bar in section, showing the clip as applied to said upright.

A represents the base. B B are the uprights. C is the drum. D D are the drum wheels or flanges. E E are clips for holding the hose, and F is the hose applied to the reel.

The base A is preferably constructed of two parallel bars or arms, $a\,a$, rigidly joined by one or more transverse bars, $a'$. The uprights B are secured to the bars $a'$, and said uprights are made straight and of only suitable lengths for handles as economy requires. They are fastened near the rear ends of said base-bars, for reasons that will further appear.

The drum C is constructed of two end pieces, C', rigidly joined and held parallel by connecting-bars $c$, arranged at equal distances from the center. In each of these end pieces are set the radial spokes $d$, to which is applied the circular rim $d'$. The wheeled drum thus or similarly constructed is mounted between the uprights B upon a rod, $c'$, which passes through both uprights, and is provided with a suitable head, $c^2$, at one end and a thumb-nut, $c^3$, at the other for clamping the reel between the uprights. Usually the head $c^2$ will be a laterally-bent portion of the rod itself, and will be let into the upright, so as to prevent the rod from turning when the nut $c^3$ is operated. Any other suitable construction may of course be employed for this purpose.

The wheels D of the drum C are made of relatively large diameter, as shown, and they are mounted as low in the frame as practicable, and as nearly over the rear of the base as will allow the reel to stand firmly when upright, in order to permit said wheels to be brought into contact with the ground and the base clear of the ground by only such backward tilting of the frame from the upright position as will bring the handles at a proper height for convenient manipulation by a person standing. In this position (indicated in Fig. 3) the apparatus is readily moved from place to place on the large drum-wheels D. To clear the base from the ground without lowering the handles too far, the uprights B, which form the handles, incline forward of the drum-axis at their upper ends when the reel-frame is resting on its base, as already stated, and as plainly shown in Fig. 1. To give this forward inclination of the handles, the uprights may be bent, if preferred, in which case they may be attached to the base at any points on the arms or bars a; but for greater economy in construction I prefer to make said uprights straight and to connect them obliquely with the base near the rear ends of the bars a, as more plainly indicated in Figs. 1 and 4.

In the reel having the low-mounted rim-wheeled drum, as above described, it will be found convenient to attach the nozzle or the hose at or near the nozzle to the spokes or rim of the drum-wheel, and to wind the hose from the nozzle end, leaving the end having the hydrant-coupling outermost of the coil and ready for connection. After making the hydrant connection the reel will be handily drawn upon the drum-wheels to the point where it is desired to stand, the hose having been wound upon the drum in proper direction for this purpose, or in a direction the reverse of that shown in Fig. 1. In thus drawing the reel, however, the hose will not pay off as fast as the reel is drawn, because of the unequal diameter of the drum-wheels and the body of hose upon the drum. So, also, in rewinding the hose upon the drum the opposite difficulty will be encountered—that is to say, the hose will be taken up less rapidly than the reel advances. To unwind the desired quantity of hose in feeding out, or to take up the slack in rewinding the hose, it will therefore be found convenient to lift the drum-wheels clear of the ground and to rotate the said drum independently. In the construction described this is done by simply raising the handles slightly, whereupon the rear ends, $a^2$, of the base-arms a strike the ground, and the apparatus is supported from these points of the base and one hand, while the remaining hand is free to rotate the reel for either running off or taking up the hose, as may be required. In unwinding the hose it may also be found convenient to momentarily raise the handles far enough to shift the weight wholly or partially from the drum-wheels to the rear ends of the base-bars a, while still drawing the reel along, thus allowing the drum-wheels to slip on or to rotate clear of the ground. To facilitate this operation the said rear ends, $a^2$, of the base-bars a are rounded upwardly, like the nose of a sled-runner, as shown, so as to prevent their catching in the grass.

If desired, and especially in the heavier reels, a transverse roller, A', small enough to rotate beneath the low-hung drum-wheels D, may be loosely mounted between the said rear ends of the base-bars, as shown in the present drawings, though generally such roller is not necessary.

As a means of holding either end of the hose, and especially for confining the nozzle end upon the drum-wheel or other part of the frame, I have devised a very simple, easily-operated, and entirely effective clip, shown at E. Said clip consists of a flat strip of metal bent on one end to the form of a hook and at the other secured by a screw, e, to the frame or wheel. When applied to the wheel, it is preferably attached pivotally to the inner face of the rim d', midway between its adjacent spokes, so that when the hose is inserted beneath the hook it will be held sufficiently bent by the adjacent parts of the wheel to prevent its slipping out of place. By thus attaching the hose near the nozzle to the rim of the wheel, and by the aid of the clamping rod and nut c' $c^3$, for setting the wheel in any desired position, the nozzle may be held so as to direct a stream upwardly, horizontally, or at any chosen inclination. Usually the wheel will be provided with four or other desired number of clips, E, as shown. To also permit the nozzle to be attached to the uprights B a clip, E, of the same construction as described, is pivoted to the inner face of the upright, just above the cross-bar b. By lifting the clip pivoted in this position the hose may be readily inserted beneath it, and upon falling it clamps and holds the hose against the cross-bar, as indicated in Figs. 1 and 6. The object of pivotally fastening the clip to the wheel-rim d' is to permit the clip to be turned into a position wholly beneath the rim, where it is out of the way of the hose in being coiled upon or unwound from the drum.

In securing the nozzle by one of the wheel-clips E preparatory to moving the reel from place to place on the wheels D it will be easy to bring the mouth of the nozzle into position to clear the ground, and, when ready for use, to shift it so that the stream will clear the wheel.

The cross-bars c of the drum may be, as shown, of such number and of such distance from the center as to produce no abrupt bend in the hose when wound thereon, so that water may flow freely through the same. If desired, said bars may be broad and rounded to form a more nearly continuous cylinder-surface than the rods shown; or a complete cylinder may be employed.

The uprights B, when both are extended upward equally, as shown, are connected rigidly by a cross-bar, b, located near their upper ends, which, with the base to which they are joined, as stated, serves to hold the uprights parallel or at a proper distance apart to allow the drum to rotate freely between them. In this case the uprights are preferably made of form and material to be flexible and elastic, so as to readily yield between their ends under pressure of the clamping-nut $c^3$, and to spring outwardly after the said nut is loosened, so as to again free the drum. As these uprights are usually and preferably of wood, they are accordingly made relatively thin and broad, as shown, and are arranged with their broader faces parallel with the ends of the drum.

If preferred, but one of the uprights may be extended far enough above the drum-axis to form a handle, and such a construction will not be a departure from my invention.

It will be observed that in the mounted reel described but little metal need be employed, and that the cost of the structure is therefore slight. While cheap, however, it is neat in appearance, convenient in use, and in capacity is suited to receive a large quantity of hose.

I claim as my invention—

1. In a portably-mounted hose-reel, the combination of a base, two uprights, B, rigidly secured to said base, and a hose drum or reel proper, C, provided with rim-wheels D, mounted between the uprights, with its axis over the rear part of the base, and with its rim-wheel near the ground, substantially as and for the purpose set forth.

2. In the apparatus described, the combination, with the two uprights and the rim-wheeled hose-drum low mounted between the uprights, as described, of the base having the uprights rigidly secured thereto, and having the rear ends of the base-arms rounded, substantially as and for the purpose set forth.

3. In the apparatus described, the combination, with the two uprights, the rim-wheeled hose-drum low mounted between the uprights, as shown, of the base-bars $a$, having the uprights severally secured thereto and rigidly joined by the cross-bar $a'$, and the free roller A', mounted between the rear ends of the base-bars, substantially as and for the purposes set forth.

4. In the apparatus described, the combination, with the base and rim-wheeled drum, of the two uprights rigidly attached to the base and supporting the drum over the rear part of the base, said uprights having their upper ends located forward of a vertical plane passing through the axis of the drum, substantially as described.

5. In combination with the wheeled reel-drum having its ends rigidly connected by cross-rods $c$, the relatively broad and thin frame-uprights B, arranged with their broader faces parallel with the reel ends, and the axial rod $c'$, for the support of the drum, provided with a head, $c^2$, and clamping-nut $c^3$, exterior to the opposite uprights, substantially as described, and for the purpose set forth.

6. In combination with the drum-wheel, the hook-formed clip E, fastened to the wheel-rim, whereby, in connection with the adjacent parts of the wheel, the hose may be held in place, substantially as described.

7. In the structure described, the combination, with the rim-wheel of the drum, of the hook-formed clip E, pivotally fastened to the inner face of the wheel-rim, substantially as and for the purposes set forth.

8. In combination with the upright B and rod $b$, the hook-formed clip E, pivotally secured to the upright above and adjacent to the rod $b$, substantially as and for the purpose set forth.

In testimony that I claim the foregoing as my invention I affix my signature in presence of two witnesses.

IVES W. McGAFFEY.

Witnesses:
M. E. DAYTON,
JESSE COX, Jr.